(12) United States Patent
Kerstetter, III et al.

(10) Patent No.: US 9,006,332 B2
(45) Date of Patent: Apr. 14, 2015

(54) WEATHERABLE AND FLAME-RESISTANT THERMOPLASTIC VULCANIZATES AND METHODS FOR MAKING THEM

(75) Inventors: Randal H. Kerstetter, III, Wadsworth, OH (US); Karla D. Caton, Copley, OH (US); Edward J. Blok, Wadsworth, OH (US); Eugene R. Uhl, Massillon, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 542 days.

(21) Appl. No.: 13/215,100

(22) Filed: Aug. 22, 2011

(65) Prior Publication Data

US 2012/0059105 A1 Mar. 8, 2012

Related U.S. Application Data

(60) Provisional application No. 61/380,006, filed on Sep. 3, 2010.

(51) Int. Cl.

| C08L 23/00 | (2006.01) |
|---|---|
| C08K 9/00 | (2006.01) |
| C08L 23/10 | (2006.01) |
| C08L 23/14 | (2006.01) |
| C09K 21/08 | (2006.01) |
| C08K 5/00 | (2006.01) |
| C08K 3/04 | (2006.01) |
| C08K 3/22 | (2006.01) |
| C08K 5/03 | (2006.01) |
| C08L 23/16 | (2006.01) |

(52) U.S. Cl.
CPC ............... *C08L 23/10* (2013.01); *C08L 23/142* (2013.01); *C09K 21/08* (2013.01); *C08K 5/0066* (2013.01); *C08K 3/04* (2013.01); *C08K 3/22* (2013.01); *C08K 5/03* (2013.01); *C08L 23/16* (2013.01); *C08L 2201/02* (2013.01)

(58) Field of Classification Search
CPC ........ C08L 23/10; C08K 5/0066; C08K 9/00; C08K 9/041
USPC .................. 524/493, 412, 445, 528; 523/200
See application file for complete search history.

(56) References Cited

U.S. PATENT DOCUMENTS

| 2,972,600 A | 2/1961 | Braidwood |
|---|---|---|
| 3,248,179 A | 4/1966 | Norwood |
| 3,287,440 A | 11/1966 | Giller |
| 4,311,628 A | 1/1982 | Abdou-Sabet et al. |
| 4,387,176 A | 6/1983 | Frye |
| 4,540,753 A | 9/1985 | Cozewith et al. |
| 4,543,399 A | 9/1985 | Jenkins, III et al. |
| 4,588,790 A | 5/1986 | Jenkins, III et al. |
| 4,594,390 A | 6/1986 | Abdou-Sabet et al. |
| 4,613,484 A | 9/1986 | Ayres et al. |
| 5,001,205 A | 3/1991 | Hoel |
| 5,028,670 A | 7/1991 | Chinh et al. |
| 5,100,947 A | 3/1992 | Puydak et al. |
| 5,157,081 A | 10/1992 | Puydak et al. |
| 5,198,401 A | 3/1993 | Turner et al. |
| 5,290,866 A | 3/1994 | Dobreski et al. |
| 5,317,036 A | 5/1994 | Brady, III et al. |
| 5,352,749 A | 10/1994 | DeChellis et al. |
| 5,391,629 A | 2/1995 | Turner et al. |
| 5,397,832 A | 3/1995 | Ellul |
| 5,405,922 A | 4/1995 | DeChellis et al. |
| 5,436,304 A | 7/1995 | Griffin et al. |
| 5,453,471 A | 9/1995 | Bernier et al. |
| 5,462,999 A | 10/1995 | Griffin et al. |
| 5,616,661 A | 4/1997 | Eisinger et al. |
| 5,627,242 A | 5/1997 | Jacobsen et al. |
| 5,656,693 A | 8/1997 | Ellul et al. |
| 5,665,818 A | 9/1997 | Tilston et al. |
| 5,668,228 A | 9/1997 | Chinh et al. |
| 5,677,375 A | 10/1997 | Rifi et al. |
| 5,693,727 A | 12/1997 | Goode et al. |
| 5,712,352 A | 1/1998 | Brant et al. |
| 5,936,028 A | 8/1999 | Medsker et al. |
| 5,952,425 A | 9/1999 | Medsker et al. |
| 6,042,260 A | 3/2000 | Heidemeyer et al. |
| 6,147,160 A | 11/2000 | Wang et al. |
| 6,437,030 B1 | 8/2002 | Coran et al. |
| 6,451,915 B1 | 9/2002 | Ellul et al. |
| 6,867,260 B2 | 3/2005 | Datta et al. |
| 6,881,800 B2 | 4/2005 | Friedersdorf |
| 6,992,158 B2 | 1/2006 | Datta et al. |
| 7,232,871 B2 | 6/2007 | Datta et al. |
| 2002/0169240 A1 | 11/2002 | Bar-Yakov et al. |

(Continued)

FOREIGN PATENT DOCUMENTS

| CN | 101469095 A | 1/2009 |
|---|---|---|
| EP | 0634421 | 1/1995 |
| EP | 0794200 | 9/1997 |
| EP | 0802202 | 10/1997 |
| JP | H07-062168 | 3/1995 |
| JP | H07-285143 | 10/1995 |
| JP | H09-012799 | 1/1997 |
| JP | H09-012800 | 1/1997 |

(Continued)

OTHER PUBLICATIONS

Chen, X. S. et al., "Synergistic effect of decobromodiphenyl ethane and montmorillonite on flame retardancy of polypropylene", Polymer Degradation and Stability, Barking, GB, vol. 94, No. 9, Sep. 1, 2009, pp. 1520-1525 (XP026322811).

Ellul et al., "Crosslink Densities and Phase Morphologies in Dynamically Vulcanized TPEs," Rubber Chemistry and Technology, vol. 68, pp. 573-584 (1995).

Ver Strate et al., "Near Monodisperse Ethylene-Propylene Copolymers by Direct Ziegler-Natta Polymerization. Preparation, Characterization, Properties," Macromolecules, 1988, vol. 21, pp. 3360-3371.

(Continued)

*Primary Examiner* — James J Seidleck
*Assistant Examiner* — Deve E Valdez

(57) ABSTRACT

A weatherable, flame-resistant thermoplastic vulcanizate composition comprising a thermoplastic matrix; and dispersed within said matrix, an at least partially cured rubber, a flame retardant, and carbon black.

22 Claims, No Drawings

(56) References Cited

U.S. PATENT DOCUMENTS

| | | |
|---|---|---|
| 2005/0107530 A1 | 5/2005 | Datta et al. |
| 2006/0269771 A1 | 11/2006 | Cogen et al. |
| 2007/0015877 A1 | 1/2007 | Burkhardt et al. |
| 2007/0238810 A1 | 10/2007 | Ellul et al. |
| 2009/0247656 A1 | 10/2009 | Jacob et al. |
| 2010/0113694 A1 | 5/2010 | Nadella et al. |
| 2010/0120953 A1 | 5/2010 | Aarts et al. |
| 2010/0298473 A1 | 11/2010 | Yokota et al. |

FOREIGN PATENT DOCUMENTS

| | | |
|---|---|---|
| JP | 2002-348430 | 12/2002 |
| WO | WO 96/08520 | 3/1996 |
| WO | WO 96/33227 | 10/1996 |
| WO | WO 97/22639 | 6/1997 |
| WO | WO 00/01745 | 1/2000 |
| WO | WO 00/01766 | 1/2000 |
| WO | WO 02/36651 | 5/2002 |
| WO | WO 03/046071 | 6/2003 |
| WO | WO 2004/009327 | 1/2004 |
| WO | WO 2004/074361 | 2/2004 |
| WO | WO 2005/092964 | 6/2005 |
| WO | WO 2008/076264 | 6/2008 |
| WO | WO 2008/124040 | 10/2008 |
| WO | WO 2009/032622 | 3/2009 |
| WO | WO 2009/153786 | 12/2009 |
| WO | WO 2011/046545 | 4/2011 |

WEATHERABLE AND FLAME-RESISTANT THERMOPLASTIC VULCANIZATES AND METHODS FOR MAKING THEM

PRIORITY CLAIM

This application claims priority to U.S. Provisional Application No. 61/380,006, filed Sep. 3, 2010, the disclosure of which is incorporated herein by reference in its entirety.

CROSS REFERENCE TO RELATED APPLICATIONS

This application is related to U.S. Non-Provisional Application No. 13/116,868, filed May 26, 2011.

FIELD OF THE INVENTION

Embodiments of the present invention are directed toward thermoplastic vulcanizates that exhibit desirable weatherability and flame resistance.

BACKGROUND OF THE INVENTION

Thermoplastic vulcanizate compositions include blends of dynamically cured rubber and thermoplastic polymers. The rubber may be dispersed within the thermoplastic resin phase as finely-divided rubber particles. These compositions have advantageously demonstrated many of the properties of thermoset elastomers, yet they are processable as thermoplastics. Because thermoplastic vulcanizates are advantageously processable as thermoplastics, elastomeric articles are often extruded from thermoplastic vulcanizates using thermoplastic extruding techniques.

Thermoplastic vulcanizates have been modified with various additives. For example, extender oils have been included to improve manufacture, processing, and provide economic value to the compositions. Likewise, inert fillers, such as clays, have been added to facilitate manufacture and add economic value to the compositions. And, carbon black has been added as a colorant or as a UV protectant.

Advantageously, additives, such as oils and fillers, can be added to the thermoplastic vulcanizate during the manufacturing process prior to dynamic vulcanization. Moreover, the fact that thermoplastic vulcanizates are processable as thermoplastics allow for the inclusion of additives after dynamic vulcanization. That is, the additives, such as fillers and oils, can be blended into the molten thermoplastic vulcanizate composition after dynamic vulcanization. The ability to add constituents after vulcanization has been especially beneficial where the additives might interfere with the vulcanization process. For example, flame retardants, such as antimony trioxide and zinc borate hydrate, which could have an inverse impact on a phenolic cure system, have been added after dynamic vulcanization to thereby produce thermoplastic vulcanizates exhibiting flame resistance.

While thermoplastic vulcanizates have proven to be versatile by accommodating various additives that can enhance the manufacture, processability, and/or ultimate utility of the compositions, the addition of additives can have an adverse impact on the thermoplastic vulcanizates. For example, thermoplastic vulcanizates generally have limits on the level of filler materials or other particulates that can be incorporated into the composition without negatively impacting one or more characteristics of the manufacture, processability, or mechanical properties of the thermoplastic vulcanizate. For example, it has been observed that thermoplastic vulcanizate compositions that include large amounts of flame retardants have a tendency to plate out, which is a phenomenon where small amounts of flame retardant migrate to the surface of the composition and deposit on fabrication equipment such as molds. Given that thermoplastic vulcanizates are prepared by employing phase-inversion techniques to provide unique compositions wherein a cured rubber is dispersed throughout a continuous plastic matrix, the ability to predict whether particular additives or combinations of additives may have an adverse impact on the thermoplastic vulcanizates is often not feasible.

Current market demands seek elastomeric materials that exhibit UV resistance and ozone resistance, as well as flame resistance. For example, the market seeks elastomeric materials that meet the standards of UL94V2 and UL746CF1. There is a desire to meet these demands with thermoplastic vulcanizates. Commercially available thermoplastic vulcanizates cannot provide these properties. The present invention addresses this demand.

SUMMARY OF THE INVENTION

One or more embodiments of the present invention provides a weatherable, flame-resistant thermoplastic vulcanizate composition comprising a thermoplastic matrix; and dispersed within said matrix, an at least partially cured rubber, a flame retardant, and carbon black.

One or more embodiments of the present invention further provides a process for producing a weatherable, flame-resistant thermoplastic vulcanizate, the method comprising dynamically vulcanizing a rubber within a molten blend that includes the rubber, a thermoplastic resin, optionally an extender, optionally carbon black, and optionally an inert filler other than carbon black, where the molten blend is substantially devoid of flame retardants, to thereby produce a thermoplastic vulcanizate; after said step of dynamically vulcanizing, blending said thermoplastic vulcanizate while in its molten state with at least one flame retardant and optionally with carbon black, with the proviso that said step of dynamically vulcanizing takes place with carbon black in the molten blend or said step of blending includes blending the thermoplastic vulcanizate with carbon black, to thereby produce a thermoplastic vulcanizate having weatherability and flame resistance; and extruding the thermoplastic vulcanizate.

DETAILED DESCRIPTION OF ILLUSTRATIVE EMBODIMENTS

Introduction

Embodiments of the invention are based, at least in part, on the discovery of a thermoplastic vulcanizate having both weatherability and flame resistance. In particular, it has been discovered that thermoplastic vulcanizates can be modified with both flame retardants and sufficient carbon black to provide thermoplastic vulcanizates that are advantageously capable of meeting the flame-resistance standards of UL94V2 and the ultraviolet light (UV) standards of UL746CF1. In fact, it has been surprisingly discovered that these thermoplastic vulcanizates can exhibit desirable mechanical properties despite the presence of the flame retardants and the carbon black, and, moreover, that these desirable properties can be maintained over long periods of exposure to heat and UV radiation. As a result, these thermoplastic vulcanizates can be used in high temperature, outdoor applications such as for seals, gaskets, and hoses for outdoor lighting and electrical applications including those devices that capture and convert solar energy. Furthermore, in one or more embodiments, it has been discovered that the thermoplastic vulcanizates of the present invention, which may be devoid of UV-stabilizers, antioxidants, and the like, other than carbon black, unexpectedly demonstrate less plate out than observed in thermoplastic vulcanizates that include similar amounts of flame retardants together with UV-stabilizers, antioxidants, or the like other than carbon black.

Thermoplastic Vulcanizate Composition

The thermoplastic vulcanizates of the present invention include a rubber phase and a thermoplastic matrix or phase including a propylene-based thermoplastic polymer. These thermoplastic vulcanizates include a sufficient amount of carbon black to provide UV resistance to the thermoplastic vulcanizate and a sufficient amount of flame retardant material to provide flame resistance to the thermoplastic vulcanizate. In one or more embodiments, the carbon black and flame retardants are dispersed throughout the plastic matrix. In other embodiments, the carbon black and flame retardants are dispersed throughout the rubber phase. In yet other embodiments, the carbon black and flame retardants are dispersed throughout both the plastic and rubber phases. The thermoplastic vulcanizates may also include other constituents that may be employed in the art of making thermoplastic vulcanizates.

Rubber Component

The rubbers that may be employed to form the rubber phase include those polymers that are capable of being cured or crosslinked. Reference to a rubber may include mixtures of more than one rubber. Non-limiting examples of rubbers include olefinic elastomeric copolymers, butyl rubber, and mixtures thereof. In one or more embodiments, olefinic elastomeric copolymers include ethylene-propylene-non-conjugated diene rubbers or propylene-based rubbery copolymers containing units derived from non-conjugated diene monomers.

The term ethylene-propylene rubber refers to rubbery copolymers polymerized from ethylene, at least one α-olefin monomer, and at least one diene monomer. The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. Copolymers prepared from ethylene, α-olefin, and diene monomers may be referred to as a terpolymer or even a tetrapolymer in the event that multiple α-olefins or dienes are used.

In one or more embodiments, the ethylene-propylene rubber includes from about 12% to about 85% by weight, or from about 20% to about 80% by weight, or from about 40 to about 70% by weight, or from about 60% to about 66% by weight ethylene units deriving from ethylene monomer, and from about 0.1% to about 15% by weight, or from about 0.5% to about 12% by weight, or from about 1% to about 10% by weight, or from about 2% to about 8% by weight diene units deriving from diene monomer, with the balance including α-olefin units deriving from α-olefin monomer (e.g., $C_3$-$C_{10}$ olefins such as propylene). Expressed in mole percent, the terpolymer of one embodiment includes from about 0.1 to about 5 mole percent, or from about 0.5 to about 4 mole percent, or from about 1 to about 2.5 mole percent diene units deriving from diene monomer. In one or more embodiments, where the diene includes 5-ethylidene-2-norbornene, the ethylene-propylene rubber may include at least 1% by weight, in other embodiments at least 3% by weight, in other embodiments at least 4% by weight, in other embodiments at least 5% by weight, in other embodiments from about 1% to about 15% by weight, in other embodiments from about 5% to about 12% by weight, and in other embodiments from about 7% to about 11% by weight units deriving from 5-ethylidene-2-norbornene. In one or more embodiments, where the diene includes 5-ethylidene-2-norbornene, the ethylene-propylene rubber may include at least 1% by weight, in other embodiments at least 3% by weight, in other embodiments at least 4% by weight, in other embodiments at least 5% by weight, in other embodiments from about 1% to about 15% by weight, in other embodiments from about 5% to about 12% by weight, and in other embodiments from about 7% to about 11% by weight units deriving from 5-ethylidene-2-norbornene. In one or more embodiments, where the diene includes 5-vinyl-2-norbornene, the ethylene-propylene rubber may include at least 1% by weight, in other embodiments at least 3% by weight, in other embodiments at least 4% by weight, in other embodiments at least 5% by weight, in other embodiments from about 1% to about 15% by weight, in other embodiments from about 5% to about 12% by weight, and in other embodiments from about 7% to about 11% by weight units deriving from 5-vinyl-2-norbornene.

In one or more embodiments, ethylene-propylene rubber may have a weight average molecular weight ($M_w$) that is greater than 100,000 g/mole, in other embodiments greater than 200,000 g/mole, in other embodiments greater than 400,000 g/mole, and in other embodiments greater than 600,000 g/mole; in these or other embodiments, the $M_w$ of the preferred ethylene-propylene rubber is less than 1,200,000 g/mole, in other embodiments less than 1,000,000 g/mole, in other embodiments less than 900,000 g/mole, and in other embodiments less than 800,000 g/mole. In one or more embodiments, useful ethylene-propylene rubbers have a number average molecular weight ($M_n$) that is greater than 20,000 g/mole, in other embodiments greater than 60,000 g/mole, in other embodiments greater than 100,000 g/mole, and in other embodiments greater than 150,000 g/mole; in these or other embodiments, the $M_n$ of the ethylene-propylene rubbers of one or more embodiments is less than 500,000 g/mole, in other embodiments less than 400,000 g/mole, in other embodiments less than 300,000 g/mole, and in other embodiments less than 250,000 g/mole. Techniques for determining the molecular weight ($M_n$, $M_w$, and $M_z$) and molecular weight distribution (MWD) may be found in U.S. Pat. No. 4,540,753, which is incorporated by reference herein, and references cited therein and in *Macromolecules,* 1988, Volume 21, pp. 3360-3371 by Verstrate et al., which is also herein incorporated by reference, and references cited therein.

In one or more embodiments, ethylene-propylene rubber may also be characterized by having a Mooney viscosity (ML (1+4 at 125° C.)) per ASTM D-1646, of from about 10 to about 500 or from about 50 to about 450. As used herein, Mooney viscosity is reported using the format: Rotor ([preheat time, min.]+[shearing time, min.] @ measurement temperature, ° C.), such that ML (1+4 @ 125° C.) indicates a Mooney viscosity determined using the ML or large rotor according to ASTM D1646-99, for a pre-heat time of 1 minute and a shear time of 4 minutes, at a temperature of 125° C.

Unless otherwise specified, Mooney viscosity is reported herein as ML (1+4 @ 125° C.) in Mooney units according to ASTM D-1646. However, Mooney viscosity values greater than about 100 cannot generally be measured under these conditions. In this event, a higher temperature can be used (i.e., 150° C.), with eventual longer shearing time (i.e., 1+8 @ 125° C. or 150° C.). More preferably, the Mooney measurement for purposes herein is carried out using a non-standard small rotor. The non-standard rotor design is employed with a change in the Mooney scale that allows the same instrumentation on the Mooney instrument to be used with polymers having a Mooney viscosity over about 100 mL (1+4 @ 125° C.). For purposes herein, this modified Mooney determination is referred to as MST—Mooney Small Thin.

ASTM D1646-99 prescribes the dimensions of the rotor to be used within the cavity of the Mooney instrument. This method allows for both a large and a small rotor, differing only in diameter. These different rotors are referred to in ASTM D1646-99 as ML (Mooney Large) and MS (Mooney Small). However, ethylene-propylene-diene monomer (EPDM) can be produced at such high molecular weight that the torque limit of the Mooney instrument can be exceeded using these standard prescribed rotors. In these instances, the test is run using the MST rotor that is both smaller in diameter and thinner. Typically, when the MST rotor is employed, the test is also run at different time constants and temperatures. The pre-heat time is changed from the standard 1 minute to 5 minutes, and the test is run at 200° C. instead of the standard 125° C. The value obtained under these modified conditions is referred to herein as MST (5+4 @ 200° C.). Note: the run time of 4 minutes at the end of which the Mooney reading is taken remains the same as the standard conditions. One MST point is approximately equivalent to 5 mL points when MST is measured at (5+4 @ 200° C.) and ML is measured at (1+4 @ 125° C.). Accordingly, for the purposes of an approximate conversion between the two scales of measurement, the MST (5+4 @ 200° C.) Mooney value is multiplied by 5 to obtain an approximate ML (1+4 @ 125° C.) value equivalent. The MST rotor used herein was prepared and utilized according to the following specifications.

The rotor should have a diameter of 30.48+/−0.03 mm and a thickness of 2.8+/−0.03 mm (determined from the tops of serrations) and a shaft of 11 mm or less in diameter.

The rotor should have a serrated face and edge, with square grooves of about 0.8 mm width and depth of about 0.25-0.38 mm cut on 1.6 mm centers. The serrations will consist of two sets of grooves at right angles to each other thereby forming a square crosshatch.

The rotor shall be positioned in the center of the die cavity such that the centerline of the rotor disk coincides with the centerline of the die cavity to within a tolerance of +/−0.25 mm. A spacer or a shim may be used to raise the shaft to the midpoint, consistent with practices typical in the art for Mooney determination.

The wear point (cone shaped protuberance located at the center of the top face of the rotor) shall be machined off flat with the face of the rotor.

Mooney viscosities of the multimodal polymer composition may be determined on blends of polymers herein. The Mooney viscosity of a particular component of the blend is obtained herein using the relationship shown in (1):

$$\log ML = n_A \log ML_A + n_B \log ML_B \quad (1)$$

wherein all logarithms are to the base 10; ML is the Mooney viscosity of a blend of two polymers A and B each having individual Mooney viscosities $ML_A$ and $ML_B$, respectively; $n_A$ represents the wt. % fraction of polymer A in the blend; and $n_B$ represents the wt. % fraction of the polymer B in the blend.

In the instant disclosure, Equation (1) has been used to determine the Mooney viscosity of blends comprising a high Mooney viscosity polymer (A) and a low Mooney viscosity polymer (B), which have measurable Mooney viscosities under (1+4 @ 125° C.) conditions. Knowing ML, $ML_A$ and $n_A$, the value of $ML_B$ can be calculated.

However, for high Mooney viscosity polymers [i.e., Mooney viscosity greater than 100 mL (1+4 @ 125° C.)], $ML_A$ is measured using the MST rotor as described above. The Mooney viscosity of the low molecular weight polymer in the blend is then determined using Equation 1 above, wherein $ML_A$ is determined using the following correlation (2):

$$ML_A(1+4@125° C.) = 5.13 * MST_A(5+4@200° C.) \quad (2)$$

In one or more embodiments, ethylene-propylene rubber may be characterized by having an intrinsic viscosity, as measured in decalin at 135° C. per ASTM D-1601, of from about 1 to about 8 dl/g, or from about 3 to about 7 dl/g, or from about 4 to about 6.5 dl/g.

In one or more embodiments, the ethylene-propylene rubber may be characterized by a glass transition temperature ($T_g$), as determined by Differential Scanning Calorimetry (DSC) according to ASTM E-1356, that is less than −20° C., in other embodiments less than −30° C., in other embodiments less than −50° C., and in other embodiments from about −20 to about −60° C.

Ethylene-propylene rubber may be manufactured or synthesized by using a variety of techniques. For example, these copolymers can be synthesized by employing solution, slurry, or gas phase polymerization techniques that employ various catalyst systems. Exemplary catalysts include Ziegler-Natta systems such as those including vanadium catalysts, and single-site catalysts including constrained geometry catalysts involving Group IV-VI metallocenes. Elastomeric copolymers are commercially available under the tradenames Vistalon™ (ExxonMobil Chemical Co.; Houston, Tex.), Keltan™ (DSM Copolymers), Nordel™ IP (Dow), NORDEL MG™ (Dow), Royalene™ (Lion Copolymer) and Buna™ (Lanxess).

Thermoplastic Resin/Matrix

The thermoplastic resin that can be employed to form the thermoplastic phase include those thermoplastic polymers that have been employed in the manufacture of thermoplastic vulcanizates as taught in the art. For purposes of this specification, the following description may also apply to the second thermoplastic resin. For example, these thermoplastic polymers, which may be referred to as thermoplastic resins or unfunctionalized thermoplastics, may include solid, generally high molecular weight plastic resins. Exemplary thermoplastic polymers include crystalline, semi-crystalline, and crystallizable polyolefins, olefin copolymers, and non-olefin resins.

The thermoplastic resins may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the reactor, impact, and random copolymers of propylene with ethylene or the higher α-olefins, described above, or with $C_{10}$-$C_{20}$ diolefins. Comonomer contents for these propylene copolymers may be from 1% to about 30% by weight of the polymer, for example, as in U.S. Pat. No. 6,867,260 B2, which is incorporated by reference herein. Copolymers available under the tradename VISTAMAXX™ (ExxonMobil) are specifically included. Other polyolefin copolymers may include copolymers of olefins with styrene such as styrene-ethylene copolymer or polymers of olefins with α,β-unsaturated acids, or α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

In one or more embodiments, the thermoplastic resins include propylene-based polymers including those solid, generally high-molecular weight plastic resins that primarily comprise units deriving from the polymerization of propylene. In certain embodiments, at least 75%, in other embodiments at least 90%, in other embodiments at least 95%, and in other embodiments at least 97% of the units of the propylene-based polymer derive from the polymerization of propylene. In particular embodiments, these polymers include homopolymers of propylene.

In certain embodiments, the propylene-based polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof.

In one or more embodiments, propylene-based polymers may include semi-crystalline polymers. In one or more embodiments, these polymers may be characterized by a crystallinity of at least 25% by weight, in other embodiments at least 55% by weight, in other embodiments at least 65%, and in other embodiments at least 70% by weight. Crystallinity may be determined by dividing the heat of fusion of a sample by the heat of fusion of a 100% crystalline polymer, which is assumed to be 209 joules/gram for polypropylene. In one or more embodiments, these polymers may be characterized by an Hf of at least 52.3 J/g, in other embodiments in excess of 100 J/g, in other embodiments in excess of 125 J/g, and in other embodiments in excess of 140 J/g.

In one or more embodiments, useful propylene-based polymers may be characterized by an $M_w$ of from about 50 to about 2,000 kg/mole, and in other embodiments from about 100 to about 600 kg/mole. They may also be characterized by a $M_n$ of about 25 to about 1,000 kg/mole, and in other embodiments about 50 to about 300 kg/mole, as measured by gel permeation chromatography (GPC) with polystyrene standards.

In one or more embodiments, useful propylene-based polymers can have a MFR (ASTM D-1238, 2.16 kg @ 230° C.) of less than 100 dg/min, in other embodiments less than 50 dg/min, in other embodiments less than 10 dg/min, and in other embodiments less than 5 dg/min. In these or other embodiments, the propylene-based polymers can have a MFR of at least 0.1 dg/min, in other embodiments 0.2 dg/min and in other embodiments at least 0.5 dg/min.

In one or more embodiments, useful propylene-based polymers can have a melt temperature ($T_m$) that is from about 110° C. to about 170° C., in other embodiments from about 140° C. to about 168° C., and in other embodiments from about 160° C. to about 165° C. They may have a glass transition temperature ($T_g$) of from about −10° C. to about 10° C., in other embodiments from about −3° C. to about 5° C., and in other embodiments from about 0° C. to about 2° C. In one or more embodiments, they may have a crystallization temperature ($T_c$) of at least about 75° C., in other embodiments at least about 95° C., in other embodiments at least about 100° C., and in other embodiments at least 105° C., with one embodiment ranging from 105° to 130° C.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In particular embodiments, the propylene-based polymers include a homopolymer of a high-crystallinity isotactic or syndiotactic polypropylene. This polypropylene can have a density of from about 0.89 to about 0.91 g/cc, with the largely isotactic polypropylene having a density of from about 0.90 to about 0.91 g/cc. Also, high and ultrahigh molecular weight polypropylene that has a fractional melt flow rate can be employed. In one or more embodiments, polypropylene resins may be characterized by a MFR (ASTM D-1238; 2.16 kg @ 230° C.) that is less than or equal to 10 dg/min, in other embodiments less than or equal to 1.0 dg/min, and in other embodiments less than or equal to 0.5 dg/min.

Carbon Black

In one or more embodiments, useful carbon black may be characterized based upon its particle size, which may be quantified according to ASTMD-3849. In one or more embodiments, the carbon black and in practicing the present invention may have a particle size of less than 65 nm, in other embodiments less than 45 nm, and in other embodiments less than 35 nm, in other embodiments less than 25 nm, and in other embodiments less than 20 nm. In these or other embodiments, the carbon black may have a particle size of from about 12 nm to about 40 nm or in other embodiments from about 15 nm to about 30 nm.

In one or more embodiments, useful carbon black may be characterized based upon its surface area, which may be quantified by BET nitrogen absorption. In one or more embodiments, the carbon black employed in practicing the present invention may have a surface area that is at least 75, in other embodiments at least 100, and in other embodiments at least 200 m$^2$/g. In these or other embodiments, the carbon black may have a surface area of from about 100 to about 300 or in other embodiments from about 150 to about 250 m$^2$/g.

In one or more embodiments, useful carbon black may be characterized based upon its iodine adsorption number, which may be quantified according to ASTMD-1510. In one or more embodiments, the carbon black employed in practicing the present invention may have an iodine absorption of at least 100, in other embodiments at least 120 and in other embodiments at least 130 mg/g. In these or other embodiments, the carbon black may have an iodine adsorption of less than 170, in other embodiments less than 160, and in other embodiments less than 150 mg/g.

Flame Retardants

The composition may include a flame retardant, such as in an amount of at least about 10 wt. %, 15 wt. %, 20 wt. %, 25 wt. %, or 30 wt. %, preferably with an upper limit of about 50 wt. %, about 40 wt. %, or about 35 wt. %, based upon the entire weight of the thermoplastic vulcanizate. In one preferable embodiment, the flame retardant is in an amount of about 28 to about 35 wt. % by weight of the thermoplastic vulcanizate.

In one or more embodiments, a three-part flame retardant filler package is employed. This three-part system includes a halogenated organic compound, a metal oxide, and a non-halogenated flame retardant. In one or more embodiments, the non-halogenated flame retardant includes a char-forming flame retardant, which may also be referred to as an intumescent material.

Types of halogenated organic compounds include halogenated hydrocarbons such as chlorinated and/or brominated phenyl-containing compounds. Examples of chlorine-containing flame retardants include chlorinated paraffins, chlorinated polyolefins, and perchlorocyclopentadecane. Examples of bromine-containing flame retardants include hexabromobenzene, n-ethylene-bisdibromonorbornane-dicarboxyimide, ethylene-bistetrabromophthalimide, tetrabromobisphenol-A derivatives, tetrabromobisphenol S, tetrabromodipentaerythritol, brominated cyctopentadieno, and decabromodiphenylethane.

In one or more embodiments, the metal oxides include those metal oxides that act synergistically with the halogenated organic compound. An example of a useful metal oxide is antimony trioxide. In other embodiments, antimony oxide sols and salts of Sb(v) esters may be employed.

In one or more embodiments, intumescent materials include those materials that expand and form a char layer as a barrier between the underlying material and surrounding environment; this char layer is hard to burn, and insulates and protects the underlining material from burning. It is believed that intumescents operate by expansion either as a result of a chemical reaction under heat, or as by a primarily physical reaction that occurs due to the configuration of components in the intumescent material. Examples of intumescent or char forming materials include zinc borate hydrate, magnesium hydroxide, aluminum trihydrate, ammonium polyphosphate, melamine polyphosphate, starch (e.g., corn starch) or other carbohydrates that form heavy char when exposed to fire, and polyhydric alcohols such as trihydroxy alcohols and tetrahydroxy alcohols.

In particular embodiments, a combination of decabromodiphenylethane, antimony trioxide, and zinc borate hydrate is employed.

Oils

In one or more embodiments, the thermoplastic vulcanizates may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated.

Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 g/mole to about 9,000 g/mole, and in other embodiments from about 700 g/mole to about 1,300 g/mole. In one or more embodiments, these oligomers include isobutenyl mer units. Exemplary synthetic oils include polyisobutylene, poly(isobutylene-co-butene), and mixtures thereof. In one or more embodiments, synthetic oils may include polylinear α-olefins, poly-branched α-olefins, hydrogenated polyalphaolefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C. In these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), and Indopol™ (Innouvene). White synthetic oil is available under the tradename SPECTRASYN™ (ExxonMobil), formerly SHF Fluids (Mobil). Oils described in U.S. Pat. No. 5,936,028, which is incorporated herein by reference, may also be employed. It is believed that synthetic oils may provide enhanced low temperature performance. Also, high temperature performance may be enhanced based upon molecular structure.

In one or more embodiments, the extender oils may include organic esters, alkyl ethers, or combinations thereof including those disclosed in U.S. Pat. Nos. 5,290,866 and 5,397,832, which are incorporated herein by reference. In one or more embodiments, the organic esters and alkyl ether esters may have a molecular weight that is generally less than about 10,000. In one or more embodiments, suitable esters include monomeric and oligomeric materials having an average molecular weight of below about 2,000 and in other embodiments below about 600. In one or more embodiments, the esters may be compatible or miscible with both the polyalphaolefin and rubber components of the composition; i.e., they may mix with other components to form a single phase. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

Polysiloxane

In one or more embodiments, the thermoplastic vulcanizates may include a polysiloxane additive. The polysiloxanes may advantageously provide processing improvements, such as better mold filling, less extruder torque, internal lubrication, mold release and faster throughput, and/or can modify surface characteristics, such as higher lubricity, less slip, lower coefficient of friction, and greater mar and abrasion resistance can be used. In some embodiments, the polysiloxane is or comprises a high molecular weight polysiloxane. In further embodiments, the polysiloxane is or comprises an ultra-high molecular weight polydialkylsiloxane. Some non-limiting examples of suitable polydialkylsiloxane include polydialkylsiloxanes having a $C_{1-4}$ alkyl group, such as polydimethylsiloxanes, polydiethylsiloxanes, polymethylethylsiloxanes, polydipropyl-siloxanes and polydibutylsiloxanes. In certain embodiments, the polysiloxane additive is or comprises a mixture of an ultra-high molecular weight polydialkylsiloxane and a polyolefin, such as polyethylene, polypropylene or a combination thereof. Some non-limiting examples of such polysiloxane mixtures include DOW CORNING.RTM. MB50 series Masterbatches such as DOW CORNING.RTM. MB50-001, MB50-002, MB50-313, MB50-314 and MB50-321, all of which are available from Dow Corning Corporation, Midland, Mich.

Polymeric Processing Additives

In certain embodiments, the thermoplastic vulcanizate may include a polymeric processing additive. The processing additive may be a polymeric resin that has a very high melt flow index. These polymeric resins include both linear and branched polymers that have a melt flow rate that is greater than about 500 dg/min, in other embodiments, greater than about 750 dg/min, in other embodiments, greater than about 1000 dg/min, in other embodiments, greater than about 1200 dg/min, and in other embodiments, greater than about 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers. Thermoplastic vulcanizates that include similar processing additives are disclosed in U.S. Pat. No. 6,451,915, which is incorporated herein by reference.

Other Constituents

In addition to the rubber, thermoplastic resins, and optional processing additives, the thermoplastic vulcanizates of the invention may optionally include one or more processing oils (aromatic, paraffinic and naphthenic mineral oils), compatibilizers, calcined clay, kaolin clay, nanoclay, talc, silicates, carbonates, sulfates, carbon black, sand, glass beads, mineral aggregates, wollastonite, mica, glass fiber, other filler, pigments, colorants, dyes, carbon black, dispersants, flame retardants, antioxidants, conductive particles, UV-inhibitors, UV-stabilizers, adhesion promoters, fatty acids, esters, paraffin waxes, neutralizers, metal deactivators, tackifiers, calcium stearate, desiccants, stabilizers, light stabilizers, light absorbers, coupling agents including silanes and titanates, plasticizers, lubricants, blocking agents, antiblocking agents, anti-static agents, waxes, foaming agents, nucleating agents, slip agents, acid scavengers, adjuvants, surfactants, crystallization aids, polymeric additives, defoamers, preservatives, thickeners, rheology modifiers, humectants, vulcanizing/cross-linking/curative agents, vulcanizing/cross-linking/curative accelerators, cure retarders, reinforcing and non-reinforcing fillers and combinations thereof and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

In particular embodiments, the thermoplastic vulcanizate compositions are devoid, essentially devoid, or substantially devoid of UV-inhibitors, UV-stabilizers, and antioxidants including, but not limited to, phenol-containing UV-inhibitors, UV-stabilizers, and antioxidants, as well as hindered amine light stabilizers other than carbon black.

Substantially devoid refers to the absence of that amount of additive (e.g., UV-inhibitor) that would have a deleterious impact on the thermoplastic vulcanizate composition, its manufacture, or use. Essentially devoid refers that to absence of more than a deminimus amount of the additive. In one or more embodiments, the thermoplastic vulcanizate compositions of the invention include less than 2 wt. %, in other embodiments less than 1 wt. %, in other embodiments less than 0.5 wt. %, in other embodiments less than 0.1 wt. %, and in other embodiments less than 0.05 wt. % of a UV-inhibitors, UV-stabilizers, antioxidants, or hindered amine light stabilizers other than carbon black.

Amounts

In one or more embodiments, the thermoplastic vulcanizates of this invention may contain a sufficient amount of the rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 wt. %, in other embodiments at least about 45 wt. %, in other embodiments at least about 65 wt. %, and in other embodiments at least about 75 wt. % of rubber (i.e., dynamically-vulcanized rubber) based upon the total weight of the thermoplastic vulcanizates. In these or other embodiments, the amount of rubber within the thermoplastic vulcanizates can be from about 10 to about 25 wt. %, about 12 to about 20 wt. %, 15 to about 90 wt. %, in other embodiments from about 45 to about 85 wt. %, and in other embodiments from about 60 to about 80 wt. %, based on the entire weight of the rubber and thermoplastic combined.

In one or more embodiments, the amount of thermoplastic polymer (i.e., uncured polymer within the thermoplastic phase) within the thermoplastic vulcanizates can be from about 10 to about 85 wt. %, in other embodiments from about 10 to about 40 wt. %, and in other embodiments from about 12 to about 30 wt. %, based on the entire weight of the rubber and thermoplastic combined. In these or other embodiments, the amount of thermoplastic polymer within the thermoplastic vulcanizates may be from about 25 to about 250 parts by weight, in other embodiments from about 50 to about 150 parts by weight, and in other embodiments from about 60 to about 100 parts by weight thermoplastic polymer per 100 parts weight rubber.

With respect to the oil, the thermoplastic vulcanizate may include from about 25 to about 250 parts by weight, or from about 50 to about 150 parts by weight, or from about 75 to about 130 parts by weight, of extender oil per 100 parts rubber. The quantity of extender oil added may depend upon the properties desired, with the upper limit depending upon the compatibility of the particular oil and blend ingredients; this limit is exceeded when excessive exuding of extender oil occurs. The amount of extender oil may depend, at least in part, upon the type of rubber. High viscosity rubbers are more highly oil extendable.

In one or more embodiments, the amount of carbon black within the thermoplastic vulcanizates may be quantified based upon the entire weight of the composition. In one or more embodiments, the thermoplastic vulcanizate composition includes at least 1.5 wt. %, in other embodiments at least 2.0 wt. %, and in other embodiments at least 3.0 wt. % carbon black based upon the entire weight of the composition. In these or other embodiments, the thermoplastic vulcanizate compositions may include from about 2.0 to about 6.0, or in other embodiments from about 2.0 to about 4.0 wt. %, or about 2. to about 4.0 wt. %, of carbon black based upon the entire weight of the composition.

In one or more embodiments, the amount of decabromodiphenylethane within the thermoplastic vulcanizates may be quantified based upon the entire weight of the composition. In one or more embodiments, the thermoplastic vulcanizate composition includes at least 2.0 wt. %, in other embodiments at least 2.5 wt. %, and in other embodiments at least 3.0 wt. % decabromodiphenylethane based upon the entire weight of the composition. In these or other embodiments, the thermoplastic vulcanizate compositions may include from about 2.0 to about 6.5, or in other embodiments from about 3.0 to about 6.0 wt. % decabromodiphenylethane based upon the entire weight of the composition.

In one or more embodiments, the amount of antimony trioxide within the thermoplastic vulcanizates may be quantified based upon the entire weight of the composition. In one or more embodiments, the thermoplastic vulcanizate composition includes at least 4.0 wt. %, in other embodiments at least 5.0 wt. %, and in other embodiments at least 6.0 wt. % antimony trioxide based upon the entire weight of the composition. In these or other embodiments, the thermoplastic vulcanizate compositions may include from about 4.0 to about 13.0, or in other embodiments from about 6.0 to about 12.0 wt. % antimony trioxide based upon the entire weight of the composition.

In one or more embodiments, the amount of zinc borate hydrate within the thermoplastic vulcanizates may be quantified based upon the entire weight of the composition. In one or more embodiments, the thermoplastic vulcanizate composition includes at least 8.0 wt. %, in other embodiments at least 10.0 wt. %, and in other embodiments at least 15.0 wt. % zinc borate hydrate based upon the entire weight of the composition. In these or other embodiments, the thermoplastic vulcanizate compositions may include from about 8.0 to about 25.0, or in other embodiments from about 12.0 to about 20.0 wt. % zinc borate hydrate based upon the entire weight of the composition.

In one or more embodiments, it has unexpectedly been discovered that a synergistic balance of the three flame retardants provides advantageous results. In these embodiments, the advantageous results are achieved when the total flame retardant loading, which may be represented by the sum of the halogenated compound (x), the metal oxide (y), and the char-forming material (z) is at least 25 wt. %, in other embodiments at least 28 wt. %, and in other embodiments at least 30 wt. %; in these or other embodiments the sum of x, y, and z is less than 40 wt. %, in other embodiments less than 38 wt. %, and in other embodiments less than 35 wt. %. In these embodiments, the amount of halogenated compound x (e.g., decabromodiphenylethane) is from about 2 to about 7 wt. %, and in other embodiments from about 3 to about 6 wt. %; the amount of the metal oxide y (e.g., antimony trioxide) is from about 2× to about 5× (i.e., twice to five times the amount of the halogenated compound), or in other embodiments from about 3× to about 4×; and the amount of the char-forming compound (e.g., zinc borate hydrate) is from about 8 to about 25 wt. %, in other embodiments from about 10 to about 20 wt. %, or in other embodiments from about 12 to about 18 wt. %, with the foregoing weight percentages being based upon the total weight of the thermoplastic vulcanizate composition.

In one or more embodiments, the amount of polysiloxane within the thermoplastic vulcanizates may be quantified based upon the entire weight of the composition. In one or more embodiments, the thermoplastic vulcanizate composition includes at least 1 wt. %, in other embodiments at least 2 wt. %, and in other embodiments at least 3 wt. % polysiloxane based upon the entire weight of the composition. In these or other embodiments, the thermoplastic vulcanizate compositions may include from about 1 to about 6, or in other embodiments from about 2 to about 5 wt. % polysiloxane based upon the entire weight of the composition.

Dynamic Vulcanization

The rubber may be dynamically vulcanized by employing various cure systems, which are known in the art. For example, phenolic resin, hydrosilation (a.k.a. silicon-containing cure systems), and free radical cure systems may be employed.

Useful phenolic cure systems are disclosed in U.S. Pat. Nos. 2,972,600, 3,287,440, 5,952,425 and 6,437,030, which are incorporated herein by reference. In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms may be employed. In one embodiment, a blend of octylphenol-formaldehyde and nonylphenol-formaldehyde resins is employed. The blend includes from about 25 to about 40 wt. % octylphenol-formaldehyde and from about 75 to about 60 wt. % nonylphenol-formaldehyde, in other embodiments, the blend includes from about 30 to about 35 wt. % octylphenol-formaldehyde and from about 70 to about 65 wt. % nonylphenol-formaldehyde. In one embodiment, the blend includes about 33 wt. % octylphenol-formaldehyde and about 67 wt. % nonylphenol-formaldehyde resin, where each of the octylphenol-formaldehyde and nonylphenol-formaldehyde include methylol groups. This blend can be solubilized in paraffinic oil at about 30% solids without phase separation.

Useful phenolic resins may be obtained under the tradenames SP-1044, SP-1045 (Schenectady International; Schenectady, N.Y.), which may be referred to as alkylphenol-formaldehyde resins. SP-1045 is believed to be a blend of octylphenol and nonylphenol formaldehyde resins that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a phenolic resin curative includes that defined according to the general formula

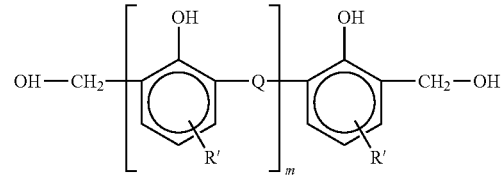

where Q is a divalent radical selected from the group consisting of —CH$_2$—, —CH$_2$—O—CH$_2$—; m is zero or a positive integer from 1 to 20 and R' is an organic group. In one embodiment, Q is the divalent radical —CH$_2$—O—CH$_2$—, m is zero or a positive integer from 1 to 10, and R' is an organic group having less than 20 carbon atoms. In other embodiments, m is zero or a positive integer from 1 to 10 and R' is an organic radical having between 4 and 12 carbon atoms.

In one or more embodiments, the phenolic resin may be employed in an amount from about 2 to about 6 parts by weight, in other embodiments from about 3 to about 5 parts by weight, and in other embodiments from about 4 to about 5 parts by weight per 100 parts by weight of rubber. A complementary amount of stannous chloride may include from about 0.5 to about 2.0 parts by weight, in other embodiments from about 1.0 to about 1.5 parts by weight, and in other embodiments from about 1.2 to about 1.3 parts by weight per 100 parts by weight of rubber. In conjunction therewith, from about 0.1 to about 6.0 parts by weight, in other embodiments from about 1.0 to about 5.0 parts by weight, and in other embodiments from about 2.0 to about 4.0 parts by weight of zinc oxide may be employed. In one or more embodiments, the olefinic rubber employed with the phenolic curatives includes diene units deriving from 5-ethylidene-2-norbornene.

Silicon-containing cure systems may include silicon hydride compounds having at least two SiH groups. Silicon hydride compounds that are useful in practicing the present invention include, but are not limited to, methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and mixtures thereof.

Useful catalysts for hydrosilylation include, but are not limited to, transition metals of Group VIII. These metals include, but are not limited to, palladium, rhodium, and platinum, as well as complexes of these metals. Useful silicon-containing curatives and cure systems are disclosed in U.S. Pat. No. 5,936,028.

In one or more embodiments, the silane-containing compounds may be employed in an amount from about 0.5 to about 5.0 parts by weight, in other embodiments from about 1.0 to about 4.0 parts by weight, and in other embodiments from about 2.0 to about 3.0 parts by weight per 100 parts by weight of rubber. A complementary amount of catalyst may include from about 0.5 to about 20.0 parts, in other embodiments from about 1.0 to about 5.0 parts, and in other embodiments from about 1.0 to about 2.0 parts of metal per million parts by weight of the rubber. In one or more embodiments, the olefinic rubber employed with the hydrosilylation curatives includes diene units deriving from 5-vinyl-2-norbornene.

In one or more embodiments, the cure system employed in practicing this invention includes a free-radical cure agent and a coagent. Free-radical cure agents include peroxides such as organic peroxides. Examples of organic peroxides include, but are not limited to, di-tert-butyl peroxide, dicumyl peroxide, t-butylcumyl peroxide, α,α-bis(tert-butylperoxy) diisopropyl benzene, 2,5-dimethyl-2,5-di(t-butylperoxy) hexane (DBPH), 1,1-di(tert-butylperoxy)-3,3,5-trimethyl cyclohexane, n-butyl-4-4-bis(tert-butylperoxy)valerate, benzoyl peroxide, lauroyl peroxide, dilauroyl peroxide, 2,5-dimethyl-2,5-di(tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used.

Useful peroxides and their methods of use in dynamic vulcanization of thermoplastic vulcanizates are disclosed in U.S. Pat. No. 5,656,693, which is incorporated herein by reference for purpose of U.S. patent practice.

In one or more embodiments, the coagent includes a multi-functional acrylate ester, a multi-functional methacrylate ester, or combination thereof. In other words, the coagents include two or more organic acrylate or methacrylate substituents.

Examples of multi-functional acrylates include diethylene glycol diacrylate, trimethylolpropane triacrylate (TMPTA), ethoxylated trimethylolpropane triacrylate, propoxylated trimethylolpropane triacrylate, propoxylated glycerol triacrylate, pentaerythritol triacrylate, bistrimethylolpropane tetraacrylate, pentaerythritol tetraacrylate, ethoxylated pentaerythritol tetraacrylate, ethoxylated pentaerythritol triacrylate, cyclohexane dimethanol diacrylate, ditrimethylolpropane tetraacrylate, or combinations thereof.

Examples of multi-functional methacrylates include trimethylol propane trimethacrylate (TMPTMA), ethylene glycol dimethacrylate, butanediol dimethacrylate, butylene glycol dimethacrylate, diethylene glycol dimethacrylate, polyethylene glycol dimethacrylate, allyl methacrylate, or combinations thereof.

In one or more embodiments of this invention, the coagent is provided to the blend or an ingredient thereof together with a carrier. In one or more embodiments, providing the coagent to the blend or an ingredient thereof may include charging, adding, mixing, feeding, injecting, and/or delivering the coagent to the blend or an ingredient thereof. In one or more embodiments, the coagent and carrier may be added to the continuous mixing equipment at the feed throat of the reactor. In other embodiments, the coagent and carrier may be added within various barrel sections or locations after the feed throat but prior to the location that dynamic vulcanization is achieved. In these or other embodiments, the coagent and carrier may be added within the first 50% of the length of the continuous mixing reactor. The coagent and carrier can be fed continuously into the continuous reactor at a single location or in multiple locations. The metering of the coagent and carrier feed can occur at a constant rate or incrementally. Where the coagent is first provided to an ingredient of the blend, a masterbatch may be formed with the coagent, carrier, and the one or more ingredients of the blend. For example, the coagent and carrier can be pre-blended with the rubber and/or thermoplastic resin prior to blending the thermoplastic resin with the rubber.

In one or more embodiments, the carrier includes a solid material; i.e., materials that are solids at standard conditions. The solids may include particulate materials. In one or more embodiments, these solids may include those compounds that, in the absence of the coagent, would be non-reactive with respect to the other ingredients or constituents of the thermoplastic vulcanizate. In one or more embodiments, the carrier is non-acidic; in these or other embodiments, the carrier may be treated to reduce acidity.

In one or more embodiments, the carrier may include silica, silicates, or a combination thereof. Silica may include precipitated silica, amorphous fumed silica, fused silica, silica gel, and/or mixtures thereof. Silicates may include those compounds containing silicon, oxygen, and one or more metals with or without hydrogen. Both synthetic and naturally occurring silicates may be used in one or more embodiments. Examples of naturally occurring silicates include gemstones, berly, asbestos, talc, clays, feldspar, mica, and mixtures thereof. An example of a synthetic silicate includes sodium silicate. Examples of silicates include tetracalcium aluminoferrate, tricalcium silicate, dicalcium silicate, calcium metasilicate, and mixtures thereof. Other useful silicates include hydrated aluminum silicates, which may also be referred to as clays. Exemplary clays include kaolinite, montmorillonite, atapulgite, illite, bentonite, halloysite, and mixtures thereof. Still other useful silicates include hydrated magnesium silicates, which may be referred to as talcs. Exemplary talcs include talcum, soapstone, steatite, cerolite, magnesium talc, steatite-massive, and mixtures thereof.

Dynamic Vulcanization Process

In one or more embodiments, the process of the present invention includes dynamic vulcanization of a rubber within a blend with a thermoplastic resin. As those skilled in the art appreciate, dynamic vulcanization includes a process whereby a rubber that is undergoing mixing with a thermoplastic resin is cured. In one or more embodiments, the rubber may be crosslinked or vulcanized under conditions of high shear at a temperature above the melting point of the thermoplastic. As a result of the process, the thermoplastic phase becomes the continuous phase of the mixture. In one or more embodiments, the rubber phase becomes a discontinuous phase of the mixture. In one or more embodiments, the rubber undergoes a phase inversion during dynamic vulcanization, where the blend, which initially includes a major volume fraction of rubber, is converted to a blend where the plastic phase is the continuous phase. In one embodiment, the rubber can be simultaneously crosslinked and dispersed as fine particles within the thermoplastic matrix, although other morphologies may also exist.

In general, the dynamic vulcanization takes place within a reactor. In one or more embodiments, the rubber and the thermoplastic resin are introduced to the reactor as solids. The rubber and plastic are then mixed at a temperature above the melt temperature of the thermoplastic resin. Following this initial blending, the curative is introduced to the blend and curing of the rubber proceeds. Oil may be injected into the reactor at various points before, during, and after the vulcanization or phase inversion step.

In one more embodiments, the carbon black may advantageously be introduced with the solid ingredients before the vulcanization step, or it may be added after the vulcanization step. When introduced to the thermoplastic vulcanizate after the dynamic vulcanization step, the introduction may take place while the composition remains in its molten state after vulcanization, or the thermoplastic vulcanizate can be cooled (e.g., pelletized) and subsequently re-processed and returned to a molten state at which time the carbon black can be added. In one or more embodiments, the carbon black may be introduced to the blend or thermoplastic vulcanizate as a mixture or masterbatch with a resin or oil. In particular embodiments, the carbon black is introduced as a mixture together with polypropylene. Similarly, the polysiloxane may be added before, during, or after dynamic vulcanization.

In one or more embodiments, the flame retardant package is introduced to the thermoplastic vulcanizate after dynamic vulcanization (i.e., after phase inversion of the rubber). The introduction of the flame retardant package may advantageously take place while the composition remains in its molten state after vulcanization, or the thermoplastic vulcanizate can be cooled (e.g., pelletized) and subsequently re-processed and returned to a molten state at which time the flame retardant package can be added. In one or more embodiments, one or more constituents of the flame retardant package may be introduced to the thermoplastic vulcanizate as a mixture or masterbatch with one or more other ingredients of the package and/or together with an inert carrier such as a thermoplastic resin or oil. In particular embodiments, the halogenated hydrocarbon and the metal oxide are introduced together as a masterbatch with polypropylene, while the intumescent material is separately added to the thermoplastic vulcanizate.

The process of dynamic vulcanization according to one or more embodiments of this invention can take place in a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruder). Methods and equipment for continuously preparing thermoplastic vulcanizates are described in U.S. Pat. Nos. 4,311,628; 4,594,390; 5,656,693; 6,147,160; and 6,042,260, as well as WO 2004/009327 A1, which are incorporated herein by reference, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed. In particular embodiments, oil is introduced to the mixture. In certain embodiments, the addition of sufficient oil allows for the achievement of particular advantageous properties of the thermoplastic vulcanizate.

Product Characteristics

In one or more embodiments, the thermoplastic vulcanizate composition includes a continuous thermoplastic phase with a cured rubber phase dispersed therein. In particular embodiments, the rubber phase is a discontinuous phase dispersed within the thermoplastic phase.

In one or more embodiments, the rubber is advantageously completely or fully cured. The degree of cure can be measured by determining the amount of rubber that is extractable from the thermoplastic vulcanizate by using cyclohexane or boiling xylene as an extractant. These methods are disclosed in U.S. Pat. No. 4,311,628, which is incorporated herein by reference. Preferably, the rubber has a degree of cure where less than 15 weight percent, more preferably less than 10 weight percent, even more preferably less than 5 weight percent, and still more preferably less than 3 weight percent of the rubber is extractable by cyclohexane at 23° C. as described in U.S. Pat. Nos. 5,100,947 and 5,157,081, which are incorporated herein by reference. Alternatively, the rubber has a degree of cure such that the crosslink density is preferably at least $4 \times 10^{-5}$, more preferably at least $7 \times 10^{-5}$, and still more preferably at least $10 \times 10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol. 68, pp. 573-584 (1995).

In one or more embodiments, the thermoplastic vulcanizate compositions of the present invention meet the flame resistance standards of UL94V2. In other embodiments, the thermoplastic vulcanizate compositions of the present invention meet the flame resistance standards of UL94V1. In yet other embodiments, the thermoplastic vulcanizates of the present invention meet the flame resistance standards of UL94V0. References to requirements of UL94 with a V0, V1, or V2 rating, as used herein, means that the referenced material meets the requirements of the UL 94 Vertical Burning Test (V0, V1 or V2), a standard known in industry and available from Underwriters Laboratories Inc., "Tests for Flammability of Plastic Materials for Parts in Devices and Appliances," Jun. 4, 2009.

In one or more embodiments, the thermoplastic vulcanizates of the present invention meet the ultraviolet light standards of UL746CF1, "Standard for Safety of Polymeric Materials—Use in Electrical Equipment Evaluations," available from Underwriters Laboratories Inc.

In one or more embodiments, the thermoplastic vulcanizates of the present invention are characterized by a Shore A hardness of at least 50, other embodiments at least 60, and in other embodiments at least 70. In these or other embodiments, the thermoplastic vulcanizates of the present invention are characterized by a Shore A hardness of less than 100, in other embodiments less than 90, and in other embodiments less than 85.

INDUSTRIAL APPLICABILITY

Thermoplastic vulcanizates of this invention are useful for making a variety of articles such as weather seals, hoses, belts, gaskets, moldings, boots, elastic fibers, and like articles. They are useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

In one or more embodiments, the thermoplastic vulcanizates of the present invention may be used in high temperature, outdoor applications such as for seals, gaskets, and hoses for outdoor lighting and electrical applications including those devices that capture and convert solar energy.

In order to demonstrate the practice of the present invention, the following examples have been prepared and tested. The examples should not, however, be viewed as limiting the scope of the invention. The claims will serve to define the invention.

EXAMPLES

A thermoplastic vulcanizate feedstock was prepared by dynamically vulcanizing an elastomeric copolymer with a phenolic resin in the presence of stannous chloride ($SnCl_2 \cdot 2H_2O$) and zinc oxide. Dynamic vulcanization was effected within large-scale, high-shear mixing equipment by employing conventional commercial techniques. The ingredients that were employed in preparing the thermoplastic vulcanizate included 100 parts by weight elastomeric copolymer, 42 parts by weight clay, 2 parts by weight zinc oxide, 1 part by weight stannous chloride, about 15 parts by weight fractional polypropylene, about 13 parts by weight of a high-MFR polypropylene, about 3 parts by weight of a phenolic resin, and about 155 parts by weight oil.

The elastomeric copolymer was poly(ethylene-co-propylene-co-5-ethylidene-2-norbornene) characterized by having a diene content of about 3.9 weight percent, a Mooney viscosity ML (1-4 @ 125° C.) of about 52 (oil extended), an intrinsic viscosity (dl/g) in decalin at 135° C. of about 4 dl/g, a weight average molecular weight of about 850 kg/mole, a number average molecular weight of about 170 kg/mole, an ethylene content of about 64 weight percent, a paraffinic oil content of 75 phr (the parts by weight in Table I referring to the amount of rubber and paraffinic oil) and was obtained under the tradename V3666™ (ExxonMobil Chemical Co.). The phenolic resin was a resole-type resin, including a blend of octylphenol and nonylphenol formaldehyde dispersed in paraffinic oil. The fractional polypropylene was a 0.8 MFR polypropylene obtained under the tradename PP534-1™ (ExxonMobil) and/or F008F™ (Sunoco). The high MFR polypropyelen was an 18 MFR polypropylene obtained under the tradename F180A™ (Sunoco). The extender oil was a paraffinic oil obtained under the tradename Sunpar 150M™ (Sunoco). The filler was a clay filler obtained under the tradename Icecap K™ (Burgess).

Portions of the thermoplastic vulcanizate feedstock prepared above were melt mixed with the other ingredients as provided in Table I. The amounts of the various ingredients that were melt mixed are provided in percent by weight, based upon the total weight of the thermoplastic vulcanizate. The fractional polypropylene was the same as employed in preparing the feedstock, the Br/Sb masterbatch was a blend of decabromodiphenylethane, antimony trioxide, and polypropylene (60%; 20%; 20%) obtained under the tradename FR 6287, the carbon black concentrate was a commercial blend including 40% carbon black and polypropylene, which obtained under the tradename 49974™ (Ampacet), and the char-forming FR was zinc borate hydrate obtained under the tradename Firebrake ZB. The thermoplastic vulcanizate samples were then fabricated into appropriate test specimens in order to conduct the following testing, the results of which are set forth in Table I.

TABLE I

| | | | | | | Samples | | | | | | |
|---|---|---|---|---|---|---|---|---|---|---|---|---|
| | 1 s.g. | 2 % | 3 % | 4 % | 5 % | 6 % | 7 % | 8 % | 9 % | 10 % | 11 % | 12 % |
| Raw Material | | | | | | | | | | | | |
| TPV Feedstock | 0.97 | 52.00 | 55.50 | 53.80 | 52.00 | 57.50 | 54.70 | 52.00 | 59.50 | 55.70 | 52.00 | 61.30 |
| Fractional Polypropylene | 0.91 | 1.00 | 3.00 | 2.50 | 2.10 | 4.00 | 3.40 | 2.70 | 5.00 | 4.20 | 3.30 | 6.20 |
| Br/Sb Masterbatch | 2.25 | 29.50 | 24.00 | 24.00 | 24.00 | 21.00 | 21.00 | 21.00 | 18.00 | 18.00 | 18.00 | 15.00 |
| Carbon Black Concentrate | 1.14 | 7.50 | 7.50 | 7.50 | 7.50 | 7.50 | 7.50 | 7.50 | 7.50 | 7.50 | 7.50 | 7.50 |
| Char-Forming FR | 2.70 | 10.00 | 10.00 | 12.20 | 14.40 | 10.00 | 13.40 | 16.80 | 10.00 | 14.60 | 19.20 | 10.00 |
| Total | | 100.00 | 100.00 | 100.00 | 100.00 | 100.00 | 100.00 | 100.00 | 100.00 | 100.00 | 100.00 | 100.00 |
| Testing Standard | | | | | | | | | | | | |
| Shore A Hardness | | 83.8 | 83.5 | 83.8 | 83.9 | 83.2 | 83.9 | 84.3 | 82.9 | 84.0 | 85.1 | 83.3 |
| Specific Gravity | | 1.277 | 1.223 | 1.246 | 1.271 | 1.195 | 1.227 | 1.265 | 1.170 | 1.213 | 1.258 | 1.145 |
| Flame Testing | | | | | | | | | | | | |
| UL 94 Rating | | NR, V1 w/outlier removed | NR | V1 | V1 | NR | NR | V1 | NR | NR | V2 | NR |

Specific gravity was determined according to TPE-0105/1, which is similar to ASTM D-792. Shore hardness was determined according to TPE-0189, which is similar to ISO 868 with a five-second time interval. Flame testing was determined according to UL 94 vertical burning test.

For examples in Table II below, Santoprene 211-45 was blended with Sunoco F008F PP, FR 6287, Ampacet 49974™ or Ampacet 49974, Firebrake ZB, MB 5-1519 (30% erucamide), and a stabilizer package containing antioxidant 58, Irganox 1035, Irganox MD 1024, Tinuvin 328 and Tinuvin 770. Injection was done via a Vandorn 170 Ton Plastic Injection Molding Machine and a two-cavity cold runner tool that is fan-gated at the top using one cavity at a time. The composition was dried for 3 hours at 160° F. The injection speed was 2 inches per second and the screw speed was 150 rpm. The composition was held at 450 to 600 psi for five seconds. The mold temperature on A side was 100° F. and on the B side was 85° F.

Table II shows the compositions and the effect of the stabilizer package on white material build-up after 200 shots of plate injection.

TABLE II

| Raw Material | Plates | | | | | |
|---|---|---|---|---|---|---|
| | 1 % | 2 % | 3 % | 4 % | 5 % | 6 % |
| Santoprene 211-45 | 54.5 | 53.0 | 51.5 | 53.0 | 52.9 | 52.9 |
| Sunoco F008F PP | 4.5 | | | 4.5 | 4.2 | 3.8 |
| FR 6287 Concentrate | 29.5 | 29.5 | 29.5 | 29.5 | 29.5 | 29.5 |
| Ampacet 19370 | 1.5 | | | 1.5 | 1.5 | 1.5 |
| Ampacet 49974 | | 7.5 | 7.5 | | | |
| Firebrake ZB | 10.0 | 10.0 | 10.0 | 10.0 | 10.0 | 10.0 |
| Antioxidant 58 | | | 0.5 | 0.5 | 0.5 | 0.5 |
| Irganox 1035 | | | 0.3 | 0.3 | 0.3 | 0.3 |
| Irganox MD 1024 | | | 0.2 | 0.2 | 0.2 | 0.2 |
| Tinuvin 328 | | | 0.2 | 0.2 | 0.2 | 0.2 |
| Tinuvin 770 | | | 0.3 | 0.3 | 0.3 | 0.3 |
| MB S-1519 (30% erucamide) | | | | | 0.3 | 0.8 |
| Total | 100.0 | 100.0 | 100.0 | 100.0 | 100.0 | 100.0 |
| Observation of material build-up | very light | none | moderate | moderate to heavy | light to moderate | light |

With respect to examples provided in Table III below, in Examples plates 7 and 8 all the black concentrate was added during the blending step. In Examples 9, 10, and 11, black concentrate was added both during the vulcanization step and the blending step. The same injection molding parameters were used to prepare the examples in Table III as described for those in Table II, except the screw speed for the examples in Table III was at 80 rpm or 150 rpm and the mold temperature on B side was 80° F.

TABLE III

| Raw Material | Plates | | | | |
|---|---|---|---|---|---|
| | 7 % | 8 % | 9 % | 10 % | 11 % |
| Santoprene 211-45 | 53.8 | 53.2 | | | |
| Santoprene 111-45 | | | 52.0 | 52.0 | 48.5 |
| Sunoco F008F PP | 3.7 | 3.7 | 1.0 | 1.0 | 0.5 |
| FR 6287 Concentrate | 29.5 | 29.5 | 29.5 | 29.5 | 29.5 |
| Silicone MB 50-321 | | | | | 4.0 |
| Ampacet 19370 | 1.5 | 1.5 | | | |
| Ampacet 49974 | | | 7.5 | 7.5 | 7.5 |
| Firebrake ZB | 10.0 | 9.9 | 10.0 | 10.0 | 10.0 |
| Anitoxidant 58 | 0.5 | 0.5 | | | |
| Irganox 1035 | 0.3 | 0.3 | | | |
| Irganox MD 1024 | 0.2 | 0.2 | | | |
| Tinuvin 328 | 0.2 | 0.2 | | | |
| Tinuvin 770 | 0.3 | 0.3 | | | |
| Calcium Stearate | | 1.0 | | | |
| Total | 100.0 | 100.0 | 100.0 | 100.0 | 100.0 |
| Number of shots | 100 | | 100 | 760 | 760 |
| Observation of material build-up | very light | moderate | none | none | none |

Various modifications and alterations that do not depart from the scope and spirit of this invention will become apparent to those skilled in the art. This invention is not to be duly limited to the illustrative embodiments set forth herein.

The present invention can be further described as follows:

Embodiment 1: A weatherable, flame-resistant thermoplastic vulcanizate composition comprising:
  i. a thermoplastic matrix; and
  ii. dispersed within said matrix, an at least partially cured rubber, a flame retardant, and carbon black.

Embodiment 2: The composition of embodiment 1, wherein the rubber is cured to an extent where less than 5% by weight of the rubber is extractable by cyclohexane at 23° C.

Embodiment 3: The composition of embodiment 1 or 2, wherein the flame retardant includes a halogenated hydrocarbon and a metal oxide.

Embodiment 4: The composition in any of embodiments 1-3, wherein the halogenated hydrocarbon is a brominated hydrocarbon and the metal oxide is antimony trioxide.

Embodiment 5: The composition in any of embodiments 1-4, wherein the flame retardant further includes a char forming material.

Embodiment 6: The composition in any of embodiments 1-5, wherein the char forming material is zinc borate hydrate.

Embodiment 7: The composition in any of embodiments 1-6, wherein the composition is substantially devoid of UV stabilizer and antioxidants other than carbon black.

Embodiment 8: The composition in any of embodiments 1-7, wherein the rubber is an at least partially cured poly(ethylene-propylene-diene)terpolymer.

Embodiment 9: The composition in any of embodiments 1-8, wherein the thermoplastic matrix includes polypropylene.

Embodiment 10: The composition in any of embodiments 1-9, wherein the thermoplastic matrix includes a first polypropylene characterized by a melt index (ASTM D-1238, 2.16 kg @ 190° C.) of less than 1.0 dg/min and a second polypropylene characterized by a melt index (ASTM D-1238, 2.16 kg @ 190° C.) greater than 10 dg/min.

Embodiment 11: The composition in any of embodiments 1-10, wherein the thermoplastic vulcanizate is characterized by a Shore A hardness of greater than 60 and less than 90.

Embodiment 12: The composition in any of embodiments 1-11, wherein the thermoplastic vulcanizate satisfies the requirements of UL94V0.

Embodiment 13: The composition in any of embodiments 1-12, wherein the thermoplastic vulcanizate satisfies the requirements of UL94V1.

Embodiment 14: The composition in any of embodiments 1-13, wherein the thermoplastic vulcanizate satisfies the requirements of UL94V2.

Embodiment 15: The composition in any of embodiments 1-14, wherein the thermoplastic vulcanizate satisfies the requirements of UL746CF1.

Embodiment 16: The composition in any of embodiments 1-15, wherein the thermoplastic vulcanizate further comprises an extender.

Embodiment 17: The composition in any of embodiments 1-16, wherein the thermoplastic vulcanizate further comprises a polysiloxane.

Embodiment 18: The composition in any of embodiments 1-17, wherein the thermoplastic vulcanizate includes from about 10 to about 25 wt. % of said rubber, from about 10 to about 25 wt. % of thermoplastic matrix, from about 25 to about 38 wt. % of flame retardant, and from about 2.0 to about 6.0 wt. % of said carbon black.

Embodiment 19: The composition in any of embodiments 1-18, wherein the thermoplastic vulcanizate includes from about 12 to about 20 wt. % of said rubber, from about 12 to about 20 wt. % of said thermoplastic, from about 28 to about 35 wt. % of said flame retardant, and from about 2.5 to about 4.0 wt. % of said carbon black.

Embodiment 20: The composition in any of embodiments 1-19, wherein the amount of the flame retardant is at least 25 wt. % and less than 35 wt. %, based upon the entire weight of the thermoplastic vulcanizate, with the amount being based upon the weight of the halogenated hydrocarbon (x), the weight of the metal oxide (y), and the weight of the char-forming material (z), and where the amount of the halogenated hydrocarbon (x) is from about 2 to about 7 wt. % based upon the entire weight of the thermoplastic vulcanizate, the amount of the metal oxide is from 2× to 5×, and the amount of the char-forming compound is about 8 to about 25 wt. % based upon the entire weight of the thermoplastic vulcanizate.

Embodiment 21: The composition in any of embodiments 1-20, wherein the flame retardant includes a halogenated hydrocarbon and a metal oxide, and the halogenated hydrocarbon is decabromodiphenylethane, the metal oxide is antimony trioxide, and the char-forming compound is zinc borate hydrate.

Embodiment 22: A method for producing a weatherable, flame-resistant thermoplastic vulcanizate, the method comprising:
  i. dynamically vulcanizing a rubber within a molten blend that includes the rubber, a thermoplastic resin, optionally an extender, optionally carbon black, and optionally an inert filler other than carbon black, where the molten blend is substantially devoid of flame retardants, to thereby produce a thermoplastic vulcanizate;
  ii. after said step of dynamically vulcanizing, blending said thermoplastic vulcanizate while in its molten state with a flame retardant and optionally with carbon black, where the flame retardant includes decabromodiphenylethane, antimony trioxide, and zinc borate hydrate, with the proviso that said step of dynamically vulcanizing takes place with carbon black in the molten blend or said step of blending includes blending the thermoplastic vulcanizate with carbon black, to thereby produce a thermoplastic vulcanizate having weatherability and flame resistance; and
  iii. extruding the thermoplastic vulcanizate.

What is claimed is:

1. A weatherable, flame-resistant thermoplastic vulcanizate composition comprising:
  i. a thermoplastic matrix; and
  ii. dispersed within said matrix, an at least partially cured rubber, a flame retardant, and carbon black,
  wherein the thermoplastic vulcanizate composition comprises from about 10 to about 30 wt. % thermoplastic resin, based on the weight of the thermoplastic vulcanizate, and from about 10 to 25 wt. % of the rubber, based on the weight of the thermoplastic vulcanizate;
  wherein the thermoplastic vulcanizate composition comprises from about 10 to about 50 wt. % of the flame retardant, based on the weight of the thermoplastic vulcanizate, where the flame retardant comprises a halogenated hydrocarbon and a metal oxide; and
  wherein the composition is substantially devoid of UV stabilizer and antioxidants other than carbon black.

2. The composition of claim 1, wherein the rubber is cured to an extent where less than 5% by weight of the rubber is extractable by cyclohexane at 23° C.

3. The composition of claim 1, wherein the halogenated hydrocarbon is a brominated hydrocarbon and the metal oxide is antimony trioxide.

4. The composition of claim 1, wherein the flame retardant further includes a char forming material.

5. The composition of claim 4, wherein the char forming material is zinc borate hydrate.

6. The composition of claim 1, wherein the rubber is an at least partially cured poly(ethylene-propylene-diene)terpolymer.

7. The composition of claim 1, wherein the thermoplastic resin includes polypropylene.

8. The composition of claim 1, wherein the thermoplastic matrix includes a first polypropylene characterized by a melt index (ASTM D-1238, 2.16 kg @ 190° C.) of less than 1.0 dg/min and a second polypropylene characterized by a melt index (ASTM D-1238, 2.16 kg @ 190° C.) greater than 10 dg/min.

9. The composition of claim 1, wherein the thermoplastic vulcanizate is characterized by a Shore A hardness of greater than 60 and less than 90.

10. The composition of claim 1, wherein the thermoplastic vulcanizate satisfies the requirements of UL94V0.

11. The composition of claim 1, wherein the thermoplastic vulcanizate satisfies the requirements of UL94V1.

12. The composition of claim 1, wherein the thermoplastic vulcanizate satisfies the requirements of UL94V2.

13. The composition of claim 1, wherein the thermoplastic vulcanizate satisfies the requirements of UL746CF1.

14. The composition of claim 1, wherein the thermoplastic vulcanizate further comprises an extender.

15. The composition of claim 1, wherein the thermoplastic vulcanizate further comprises a polysiloxane.

16. The composition of claim 1, wherein the thermoplastic vulcanizate includes from about 10 to about 25 wt. % of said rubber, from about 10 to about 25 wt. % of said thermoplastic resin, from about 25 to about 38 wt. % of said flame retardant, and from about 2.0 to about 6.0 wt. % of said carbon black, all amounts based on the weight of the thermoplastic vulcanizate.

17. The composition of claim 1, wherein the thermoplastic vulcanizate includes from about 12 to about 20 wt. % of said rubber, from about 12 to about 20 wt. % of said thermoplastic resin, from about 28 to about 35 wt. % of said flame retardant, and from about 2.5 to about 4.0 wt. % of said carbon black, all amounts based on the weight of the thermoplastic vulcanizate.

18. The composition of claim 1, wherein the thermoplastic vulcanizate comprises at least 25 wt. % and less than 35 wt. %, based upon the entire weight of the thermoplastic vulcanizate, of the flame retardant and wherein the flame retardant comprises a halogenated hydrocarbon (x), a metal oxide (y), and a char-forming material (z), where the amount of the halogenated hydrocarbon (x) is from about 2 to about 7 wt. % based upon the entire weight of the thermoplastic vulcanizate, the amount of the metal oxide is from two times to five times the amount of the halogenated hydrocarbon (x), and the amount of the char-forming compound is about 8 to about 25 wt. % based upon the entire weight of the thermoplastic vulcanizate.

19. The composition of claim 1, wherein the flame retardant further comprises a char-forming compound, wherein the halogenated hydrocarbon is decabromodiphenylethane, the metal oxide is antimony trioxide, and the char-forming compound is zinc borate hydrate.

20. A method for producing a weatherable, flame-resistant thermoplastic vulcanizate, the method comprising:
  i. dynamically vulcanizing a rubber within a molten blend that includes the rubber, a thermoplastic resin, optionally an extender, optionally carbon black, and optionally an inert filler other than carbon black, where the molten blend is substantially devoid of flame retardants, to thereby produce a thermoplastic vulcanizate;

ii. after said step of dynamically vulcanizing, blending said thermoplastic vulcanizate while in its molten state with a flame retardant and optionally with carbon black, where the flame retardant includes decabromodiphenylethane, antimony trioxide, and zinc borate hydrate, with the proviso that said step of dynamically vulcanizing takes place with carbon black in the molten blend or said step of blending includes blending the thermoplastic vulcanizate with carbon black, to thereby produce a thermoplastic vulcanizate having weatherability and flame resistance; and iii. extruding the thermoplastic vulcanizate, wherein the thermoplastic vulcanizate comprises from about 10 to about 30 wt. % of thermoplastic resin, from about 10 to 25 wt. % of rubber, and from about 10 to about 50 wt. % of flame retardant, based on the weight of the thermoplastic vulcanizate, and wherein the composition is substantially devoid of UV stabilizer and antioxidants other than carbon black.

21. The composition of claim 1, wherein the amount of the flame retardant is from about 22 wt. % to about 35 wt. %, based upon the entire weight of the thermoplastic vulcanizate composition, wherein the flame retardant includes a halogenated hydrocarbon, a metal oxide and a char-forming material, and where the amount of the halogenated hydrocarbon is from about 9 to about 17.7 wt. % based upon the entire weight of the thermoplastic vulcanizate composition, the amount of the metal oxide is from about 3.0 to about 5.9 wt. % based upon the entire weight of the thermoplastic vulcanizate composition, and the amount of the char-forming compound is about 10.0 to about 19.2 wt. % based upon the entire weight of the thermoplastic vulcanizate composition.

22. A weatherable, flame-resistant thermoplastic vulcanizate composition comprising an at least partially cured rubber dispersed in a thermoplastic matrix, wherein the thermoplastic vulcanizate composition comprises:

(i) from about 10 to about 40 wt. % thermoplastic resin, based on the weight of the thermoplastic vulcanizate composition;

(ii) from about 10 to about 25 wt. % rubber, based on the weight of the thermoplastic vulcanizate composition;

(iii) from about 1.5 to about 6.0 wt. % carbon black, based on the weight of the thermoplastic vulcanizate composition;

(iv) from about 10 wt. % to about 50 wt. % flame retardant, based on the weight of the thermoplastic vulcanizate composition;

(v) clay;

(vi) oil; and (vii) less than 2 wt. % of UV stabilizers and antioxidants other than carbon black, and wherein the thermoplastic vulcanizate has a Shore A hardness of at least 50.

* * * * *